United States Patent Office 2,707,180
Patented Apr. 26, 1955

2,707,180
CHLOROPRENE EMULSION POLYMERIZATION PROCESS

John T. Maynard, Wilmington, Del., assignor to E. I. du Pont de Nemours and Company, Wilmington, Del., a corporation of Delaware No Drawing. Application October 8, 1951, Serial No. 250,381

3 Claims. (Cl. 260—92.3)

This invention relates to the polymerization of chloroprene (2-chlorobutadiene) and more particularly to a new process for the production of polychloroprenes of superior properties.

The polymerization of chloroprene monomer is generally initiated by free-radical catalysts. Peroxy compounds have usually been employed. Furthermore, the chloroprene monomer employed in polymerization contains substantial amounts of chloroprene peroxides unless it has been subjected to a rigorous purification. Not only do these peroxides in themselves initiate polymerization at temperatures conventionally used but the resulting polymer obtained is usually a gel as a result of exposure to these active peroxides. The concentration and activity of peroxide present is not subject to careful control.

The polymers resulting from polymerization of chloroprene by free-radicals from peroxy compound catalysts at relatively high temperatures, to give high yields in relatively short times, have several deficiencies, e. g., they are inferior in plasticity and in the solubility desired for fabrication.

Large amounts of initiators and polymerization regulators have been used to give plastic and soluble products, but the resulting highly modified products have inferior vulcanizate properties, for example, they lack resilience. U. S. 2,494,087 ascribes inferior plasticity to impurities in the chloroprene monomer. Increased plasticity is obtained through the addition of alkyl mercaptans to the monomer in the presence of selected reducing agents while the polymerization is effected at 40° C. A further method suggested for the preparation of plastic polymers is that of U. S. 2,234,211 wherein an amine is incorporated in emulsified polymer.

A further serious technical problem is the crystallization freeze behavior of the polychloroprenes. This has been described by Mayo, Ind. Eng. Chem. 42, 696 (1950). As yet, no method has been described whereby soluble, plastic, and freeze-resistant polychloroprene is readily available. Heretofore, methods of obtaining decreased gelling tendencies involve low temperature polymerizations, which do not lead to polymers having good resistance to crystallization freezing.

This invention has as an object the preparation of plastic, freeze-resistant polychloroprene soluble in liquid aromatic hydrocarbons, particularly xylene, also chlorinated hydrocarbons, e. g., $CHCl_3$, carbon bisulfide, etc. A further object is the provision of a reproducible process for preparing, in good yield in relatively short time, polychloroprene of decreased gelling tendencies. Other objects will appear hereinafter.

These objects are accomplished by the invention of the process wherein an aqueous dispersion of chloroprene containing a rubber antioxidant in amounts of between 0.02 to 5% by weight, based on the chloroprene, is polymerized by bringing said dispersion in contact, at 40–125° C., with from 0.01 to 1%, based on the chloroprene, of an azo compound which has an acyclic azo group, —N=N—, bonded to separate, i. e., distinct, i. e., discrete carbons which are aliphatic in character, i. e., non-aromatic, i. e., aliphatic or cycloaliphatic, at least one of which is tertiary, which carbons have further attached through another carbon a negative radical which has the three remaining valences of the latter carbon satisfied only by elements of atomic number of 7 to 8 (oxygen and/or nitrogen), in the presence of a polymerization regulator in amounts of between 0.1 to 2%, until 50–80% of the chloroprene monomer has been converted to polymer.

The following examples in which parts are by weight are illustrative of the invention.

EXAMPLE I

A pressure vessel was flushed with nitrogen and charged with the following:

100 parts chloroprene
4 parts Resin 731 SA (a "disproportionated rosin")
0.4 part dodecyl mercaptan
0.6 part 1,1'-azodicyclohexanecarbonitrile
0.2 part phenothiazine
0.2 part para(t.-butyl)catechol
160 parts deoxygenated water
0.95 part of the sodium salt of a naphthalenesulfonic acid-formaldehyde condensation product The vessel was sealed and rocked for 45 minutes in a water bath held at 90° C. After the vessel had been cooled, the contents were drowned in methanol and the coagulated polymer washed and dried on warm mill rolls. The product consisted of 78 parts of a plastic, tacky elastomer readily soluble in aromatic hydrocarbons, e. g., xylene.

Experiments identical except that no phenothiazine or para(t.-butyl)catechol had been added gave a high conversion to a tough, insoluble, intractable polymer with and without the addition of the 1,1'-azodicyclohexanecarbonitrile initiator.

EXAMPLE II

The following solutions were prepared:

200 parts chloroprene
0.8 part dodecyl mercaptan
8.0 parts Resin 731 SA
0.4 part phenothiazine
0.4 part para(t.-butyl)catechol
320 parts deoxygenated water
1.9 parts sodium hydroxide
1.2 parts of the sodium salt of a naphthalenesulfonic acid-formaldehyde condensation product One-quarter of each of these solutions was added to a reaction vessel and stirred under an atmosphere of nitrogen at 65° C. for 90 minutes as a control, while the remainder of each of the solutions was placed in another reaction vessel with 0.06 part of alpha,alpha'-azobis-(alpha,gamma-dimethylvaleronitrile) initiator and also stirred under an atmosphere of nitrogen at 65° C. for 90 minutes. The resulting dispersions were drowned in methyl alcohol. The control, which contained no initiator, gave only a trace of coagulated polymer, while the remainder, which contained 0.04% initiator based on chloroprene, gave 89 parts (60% conversion) of a plastic elastomer soluble in xylene.

EXAMPLE III

Aliquots of the following solutions were charged under an atmosphere of nitrogen to each of eight pressure vessels:

600 parts chloroprene
2.4 parts dodecyl mercaptan
24.0 parts Resin 731 SA
1.2 parts para(t.-butyl)catechol
1.2 parts phenothiazine
0.15 part alpha,alpha'-azodiisobutyronitrile
960 parts deoxygenated water
4.85 parts sodium hydroxide
3.6 parts of the sodium salt of a naphthalenesulfonic acid-formaldehyde condensation product The vessels were agitated for a period of four hours in a water bath held at 80° C. They were then cooled, the latices combined and coagulated by the addition of saturated brine containing 2.5% acetic acid. The resulting polymer was washed and dried on warm mill rolls with the addition of four parts of phenyl alpha-naphthylamine antioxidant. There was obtained 370 parts or a 62% conversion of a plastic elastomer soluble in xylene.

EXAMPLE IV

The following was stirred in a reaction vessel under an atmosphere of nitrogen at 40° C.:

200 parts chloroprene
0.8 part dodecyl mercaptan
8.0 parts Resin 731 SA
0.04 part phenothiazine
0.04 part para(t.-butyl)catechol
0.06 part alpha,alpha'-azobis(alpha, gamma, gamma-trimethylvaleronitrile)
320 parts deoxygenated water
1.63 parts sodium hydroxide
1.2 parts of the sodium salt of a naphthalenesulfonic acid-formaldehyde condensation product After the reaction had been allowed to proceed for 125 minutes, the latex was cooled and coagulated with acidified brine and the polymer washed and dried on warm mill rolls with the addition of 1.3 parts phenyl alpha-naphthylamine antioxidant. There was obtained 122 parts or a 60% conversion of a plastic elastomer soluble in xylene.

EXAMPLE V

The following materials were charged into a stainless steel rocker bomb which had been carefully flushed with nitrogen:

200 parts chloroprene
1.6 parts dodecyl mercaptan
0.10 part phenothiazine
0.10 part para(t.-butyl)catechol
0.15 part 1,1'-azodicyclohexanecarbonitrile
320 parts deoxygenated water
12 parts lauryl pyridinium chloride The bomb was heated to 105° C. and agitated for a period of 60 minutes. There resulted a latex which was coagulated in methanol to give a polymer which after washing and drying on warm mill rolls consisted of 103 parts of a soft, tacky elastomer readily soluble in xylene. There was also obtained 20–30 parts of precoagulate consisting of a soft, apparently low molecular weight polymer.

EXAMPLE VI

A stainless steel rocker bomb was charged with the following, then heated and agitated at 125° C. for a period of 15 minutes:

200 parts chloroprene
1.2 parts dodecyl mercaptan
0.10 part phenothiazine
0.10 part para(t.-butyl)catechol
0.10 part 1,1'-azodicyclohexanecarbonitrile
320 parts deoxygenated water
8.0 parts lauryl pyridinium chloride The polymer isolated from the resulting latex by the procedure described in Example IV consisted of 85 parts of a plastic elastomer possessing solubility in aromatic hydrocarbons.

EXAMPLE VII

Each of two pressure vessels was charged with the following:

75 parts chloroprene
0.3 part dodecyl mercaptan
3.0 parts disproportionated rosin
120 parts water
0.61 part sodium hydroxide
0.45 part of the sodium salt of a naphthalenesulfonic acid/formaldehyde condensation product To each of these vessels was added 0.32 part of methane-bis(2,4-dimethyl-5-hydroxybenzene), a highly effective rubber antioxidant, and to one vessel there was also added 0.02 part of azodiisobutyronitrile as initiator. The vessels were carefully swept out with nitrogen, sealed, and agitated for 90 minutes in a water bath held at 80° C. The contents were then coagulated in methanol and the resulting polymers washed and dried on warm mill rolls. The vessel to which the azonitrile initiator had been added yielded 58 parts of plastic, rubbery polymer while the control, which did not contain initiator, contained only about five parts of low molecular weight polymer.

EXAMPLE VIII

Each of two reaction vessels equipped for stirring and fitted with thermometer, nitrogen inlet, and reflux condenser was charged with the following:

100 parts chloroprene
4.0 parts disproportionated rosin
0.4 part dodecyl mercaptan
160 parts water
0.85 part sodium hydroxide
0.6 part sodium salt of a naphthalenesulfonic acid/formaldehyde condensation product To each vessel there was also added 0.25 part of phenyl alpha-naphthylamine and to one vessel 0.1 part of alpha,-alpha'-azobis(alpha,gamma-dimethylvaleronitrile). The two reactors were stirred under slight reflux at 55–60° C. for 60 minutes, after which time the contents were cooled and coagulated by the addition of saturated brine containing 2.5% acetic acid. The polymers which coagulated were washed and dried on warm mill rolls. The reaction mixture which contained the azonitrile initiator yielded 77.5 parts of a tough, plastic polychloroprene, while the control yielded only about ten parts of soft, tacky polymer.

When the processes of Examples I to VIII were repeated but the substitution of the azo polymerization catalyst by a peroxy catalyst, e. g., a persulfate, substantially no polymer was obtained.

The following table illustrates the unusual freeze-resistance of polymers obtained by the process of this invention. The first example in the table illustrates a polychloroprene obtained by the conventional peroxy-initiated polymerization, whereas the remainder were prepared according to the technique of the present invention.

*Crystallization freeze behavior of uncured polychloroprenes at 3° C.*

| Polymerization Temperature | Shore Hardness | | Time to Final Hardness, Hr. |
|---|---|---|---|
| | Time for 20 Pt. Increase, Hr. | Final Value | |
| 40° C. (Peroxide, initiated) | 3 | 83 | 96 |
| 55° C. (General process of Ex. IV) | 35 | 72 | 175 |
| 65° C. (Ex. II) | 140 | 60 | 300 |
| 80° C. (Ex. III) | (1) | 45 | 600 |

1 Not reached in 600 hrs.

It is surprising that the antioxidants may be incorporated in the polymerization recipe. These materials are regarded as inhibitors and are effective in inhibiting polymerization upon introduction in a system wherein the initiator is a free-radical generating peroxy catalyst. The preferred inhibitors employed are compounds well known in the rubber art, conventionally added to rubber materials during the compounding to prevent the oxidative degradatiton of the rubber. They are also used to stop peroxy catalyzed polymerization of chloroprene as shown in Mochel U. S. application Ser. No. 40,612 (now U. S. Patent 2,567,117). These compounds are known as antioxidants and are, in general, aromatic hydroxy and amino compounds or their condensation products, for example the condensation products of aryl amines with aliphatic carbonyl compounds.

The antioxidants (inhibitors) useful in the process of this invention are those known in the polymerization and rubber art to be effective in stabilizing rubber against oxidative degradation and are employed as such in rubber formulations. These are in general aromatic amine or hydroxy compounds or simple derivatives thereof. The amines include primary amines, e. g., 2,4-meta-toluylenediamine, and p,p'-diaminodiphenylmethane; secondary amines, e. g., diphenyl, o- and p-ditolylamine, phenyl-alpha (and beta)-naphthylamine, 2,4-diaminodiphenylamine, 1,2-bis(phenylamino)-ethane, di-beta-naphthyl-p-phenylenediamine, phenothiazine and derivatives thereof; hydroxy compounds, e. g., p-phenylphenol hydroquinone, p-hydroxydiphenyl, catechol, aminophenols, e. g., p-aminophenol and condensation products of the above with such compounds as acetaldehyde, acetone, butyraldehyde, and salts such as of dicatechol borate. Of the antioxidants, phenothiazine and para(tertiary-butyl)-catechol or mixtures thereof are preferred.

The amount of antioxidant (inhibitor) present during polymerization should be at least least 0.02 and generally at least 0.05% based on the weight of chloroprene. Amounts of as high as 5% may be present but generally the amount does not exceed 2%.

Polymerization regulators are employed in this invention to prevent gel formation and obtain products of superior milling properties. These regulators include the aliphatic mercaptans having from 8 to 18 carbon atoms, e. g., the alkanethiols, 1-dodecanethiol, 1-tetradecanethiol, 1-hexadecanethiol, and 1-octadecanethiol. The amount of regulator is generally within the range of 0.1 to 2% based on the weight of chloroprene monomer. The exact amount employed is dependent upon its relative activity, e. g., the lower thiols are generally used in lower concentrations. Polymerization regulators are further described in U. S. 2,281,613 and 2,434,054.

The extent of conversion of monomeric chloroprene to the polymer should be within the range of 50–80%. Preferred properties are obtained at a conversion of 60–70%. Higher conversions generally result in products which tend to become insoluble on prolonged aging. Polymerization can be stopped by cooling, removing monomeric 2-chlorobutadiene by evaporation, or coagulating the polymer latex when the desired conversion has been attained. The conversion and its rate depends on the specific system employed. In general, higher temperatures favor lower conversions.

The chloroprene monomer that is available contains peroxides which are formed upon exposure to air during commercial operations. The amount of peroxide oxygen present is at least 10 parts per million and can exceed 100 p. p. m. In view of the unusual activity of the azo compounds employed as catalysts, no special effort to remove the peroxides or inhibitors is required, thus simplifying the production problems. Since there may be some variation in peroxide content during manufacture, the process of this invention gives more reproducible results in day to day production than the previously known peroxide (e. g., persulfate) initiated polymerizations.

In the process of this invention there is employed as a catalyst or initiator of polymerization, an azo compound which has an acyclic azo, —N=N—, group bonded to separate carbons aliphatic in character, i. e., non-aromatic, i. e., aliphatic or cycloaliphatic, at least one of which is tertiary, i. e., attached to three other carbons by single valences, with the tertiary carbon further attached to another carbon the three remaining valences of which are satisfied by at least one element of atomic number 7 to 8 (oxygen and/or nitrogen). Symmetrical azo compounds having the acyclic azo nitrogens attached to two tertiary carbons each having as the negative group attached to the tertiary carbons, a cyano, carbonamide, or carbalkoxy group are active at lower temperatures and are preferred. The nitriles, lower (one to six carbon) alkyl esters, and carbonamides of alpha,alpha'-azobis-alkanoic acids are preferred. Of the carbalkoxy groups, the alkyl is generally of one to six carbons. The negative radical in general is neutral with respect to acidity and of these neutral radicals the nitrile is preferred since the azonitriles are more readily obtained and have high activity. The azobiscyanoalkanes are particularly useful.

Examples of azo catalysts which may be used in the process of this invention are carbamylazoisobutyronitrile, alpha,alpha'-azodiisobutyronitrile, alpha,alpha'-azobis-(alpha,gamma-dimethylvaleronitrile), alpha,alpha'-azobis(alpha-phenylpropionitrile), alpha,alpha'-azobis-(alpha-cyclopropylpropionitrile), alpha,alpha'-azobis(alpha-n-butylcapronitrile), alpha,alpha'-azobis(alpha,gamma,-gamma-trimethylvaleronitrile), alpha,alpha'-azobis(alpha-methyl-gamma-carboxybutyronitrile), 1,1'-azodicyclo-hexanecarbonitrile, the azonitrile derived from camphor (i. e., 1,1'-azodicamphanecarbonitrile), alpha,alpha'-azo-diisobutyramide, N,N-alpha,alpha'-azodiisobutyrodiethyl-amide, dimethyl- and dihexylazodiisobutyrate. The azo compounds may be prepared in the manner described by Thiele and Stange, Ann. 283, 33–37 (1894), Thiele and Heuser, Ann. 290, 1–43 (1896), Hartmann, Rec. trav. chim. 46, 150–183 (1927). A convenient method is that of Alderson and Robertson U. S. Patent 2,469,358. The azonitriles can be converted to amides or esters by formation of the iminoether hydrochloride by reaction with hydrogen chloride and an alcohol and reaction with ammonia or a hydrogen bearing amine or an alcohol.

The more useful catalysts have aliphatic and/or cycloaliphatic radicals of four to eleven carbons on each of the azo nitrogens. Azobiscyanohydrocarbons or aliphatic character and especially azobiscyanoalkanes are particularly preferred. These catalysts are further described in Hunt U. S. Patent 2,471,959.

The catalysts of Hill U. S. Patent 2,556,876 and of Robertson U. S. Patent 2,520,338 can also be employed.

The amount of azo catalyst employed is between 0.01 and 1%. Superior properties in the polymer are obtained when between 0.01 and 0.05% of catalyst is employed. The exact amount is dependent upon the inherent activity of the catalyst under conditions of time and temperature chosen. Times of from a few minutes to several hours yield polymers under the conditions of this invention. The temperature may vary from 40° to 125° C., with temperatures of within the range of 60° to 105° C. generally preferred.

The polymerization system of this invention is an aqueous medium. Dispersants to form emulsions are employed, e. g., alkali metal salts of sulfonic acids, rosin and rosin derivatives, or quaternary ammonium salts. Modifiers and similar agents can be added to the polymerization system, e. g., sulfur and sulfur compounds such as thiols to influence advantageously the properties of the resultant polymer. The amount of water present during polymerization is not critical with amounts of one to ten times the amount of chloroprene present customarily employed. The pH of the polymerization system is generally between 10 and 12.

The process of this invention offers a heretofore unavailable method for the preparation of a freeze-resistant chloroprene polymer. The product obtained is soluble in organic solvents and is plastic. Without the combination of the antioxidant (inhibitor) and the azo catalyst neither of these advantages would be obtained. The synthetic rubber thus available has excellent physical properties and in particular is surprisingly resistant to the crystallization or freezing characteristics of the polymers obtained by conventional polymerization techniques. The products are of utility in the preparation of highly stable, temperature resistant articles, e. g., rubber tires, formulation of coatings, etc.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for obtaining a soluble, plastic, freeze-resistant chloroprene polymer which comprises polymerizing chloroprene at 40–125° C. in aqueous dispersion containing from 0.02 to 5%, based on the chloroprene, of a polyhydric phenolic rubber anti-oxidant, from 0.1 to 2%, based on the chloroprene, of an alkane thiol of 8 to 18 carbons, and, as the polymerization initiator, from 0.01 to 1%, based on the chloroprene, of an azo compound which has its azo group attached to two monovalent cyanohydrocarbon radicals wherein the cyano group is on tertiary carbon bonded to the azo group until 50–80% of the chloroprene is converted to polychloroprene and then isolating the polychloroprene.

2. Process for obtaining a soluble, plastic, freeze-resistant chloroprene polymer which comprises polymerizing chloroprene, at 40–125° C. in aqueous dispersion containing from 0.02 to 5%, based on the chloroprene, of a butylcatechol rubber anti-oxidant, from 0.1 to 2%, based on the chloroprene, of an alkane thiol of 8 to 18 carbons, and, as the polymerization initiator, from 0.01 to 1%, based on the chloroprene, of an azo compound which has its azo group attached to two nonvalent cyanohydrocarbon radicals wherein the cyano groups is on tertiary carbon bonded to the azo group until 50–80% of the chloroprene is converted to polychloroprene and then isolating the polychloroprene.

3. Process for obtaining a soluble, plastic, freeze-resistant chloroprene polymer which comprises polymerizing chloroprene at 40–125° C. in aqueous dispersion to 50–80% conversion with, as polymerization initiator, from 0.01 to 1%, by weight of the chloroprene, of an azo compound which has its azo group attached to two monovalent cyanohydrocarbon radicals wherein the cyano group is on tertiary carbon bonded to the azo group, said aqueous chloroprene dispersion containing from 0.02 to 5%, by weight of the chloroprene, of a mixture consisting of equal parts of phenothiazine and p. tertiary butylcatechol and from 0.1 to 2.0%, by weight of the chloroprene, of dodecylmercaptan.

References Cited in the file of this patent

UNITED STATES PATENTS

| | | |
|---|---|---|
| 1,967,861 | Collins | July 24, 1934 |
| 2,234,211 | Walker | Mar. 11, 1941 |
| 2,471,959 | Hunt | May 31, 1949 |